Dec. 18, 1962  R. M. NEFF  3,069,149
COIL SPRING SUSPENSION WITH AUXILIARY OVERLOAD BUMPER
Filed May 31, 1960  2 Sheets-Sheet 1

INVENTOR.
Russell M. Neff
BY
W.F. Wagner
ATTORNEY

Dec. 18, 1962 R. M. NEFF 3,069,149
COIL SPRING SUSPENSION WITH AUXILIARY OVERLOAD BUMPER
Filed May 31, 1960 2 Sheets-Sheet 2
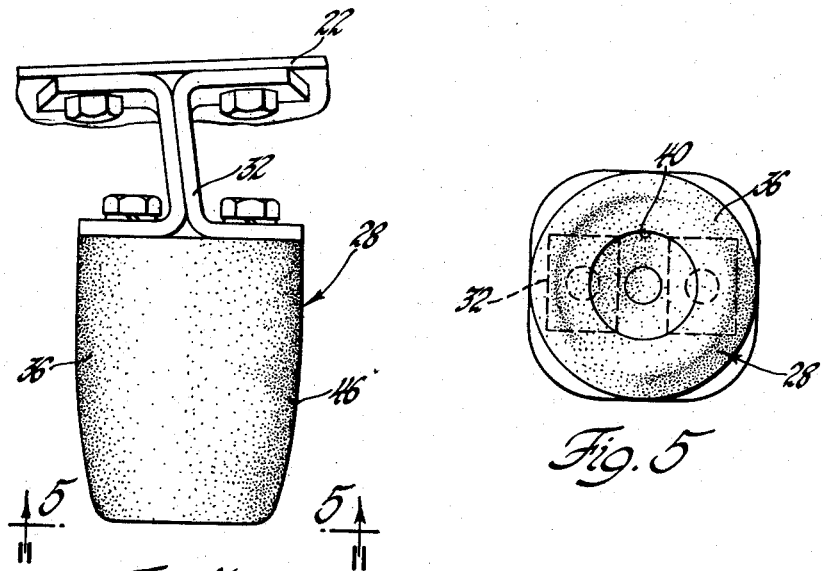
Fig. 4
Fig. 5
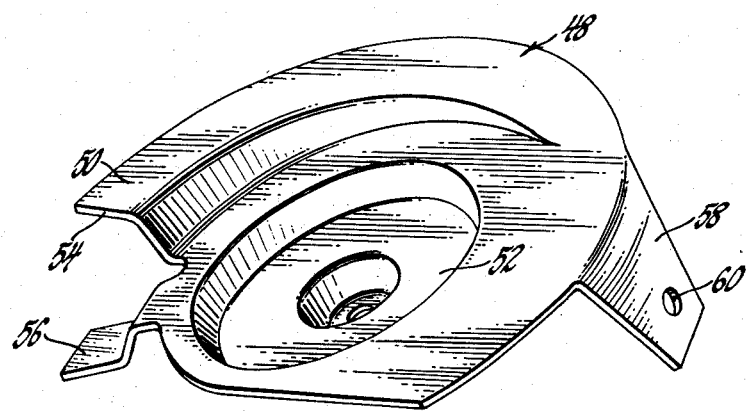
Fig. 6
INVENTOR.
Russell M. Neff
BY
W. F. Wagner
ATTORNEY United States Patent Office 3,069,149
Patented Dec. 18, 1962

3,069,149
COIL SPRING SUSPENSION WITH AUXILIARY OVERLOAD BUMPER
Russell M. Neff, Highland Park, Mich., assignor to General Motors Corporation, Detroit, Mich., a corporation of Delaware
Filed May 31, 1960, Ser. No. 32,896
3 Claims. (Cl. 267—33)

This invention relates to vehicle suspension and more particularly to coil spring suspension incorporating auxiliary overload supporting means.

An object of the invention is to provide an improved vehicle suspension.

Another object is to provide a coil spring rear wheel suspension for vehicles incorporating opposed resilient bump stops which are adapted to assist in supporting vehicle overload.

Still another object is to provide a coil spring suspension wherein a pair of elastomeric bump stops arranged within the coil spring in vertically opposed relation are adapted to sequentially engage a floating striker plate secured intermediately on the coil spring.

Yet a further object is to provide a device of the stated character wherein the cross sectional configuration of each bump stop is such that they exhibit variable rate characteristics under conditions of progressively increasing compression loading.

A still further object is to provide, in a construction of the type described, a striker plate which is so formed as to permit simple and positive attachment to the coil spring while allowing vertical adjustment thereof by rotation relative to the latter.

These and other objects, advantages, and features of the invention will become more fully apparent as reference is had to the accompanying specification and drawings wherein:

FIG. 4 is an enlarged fragmentary view of the upper bump stop shown in FIG. 1;

FIG. 5 is a view looking in the direction of arrows 5—5 of FIG. 4; and

FIG. 6 is an enlarged perspective view of the striker plate shown in FIG. 1.

Figure 1:
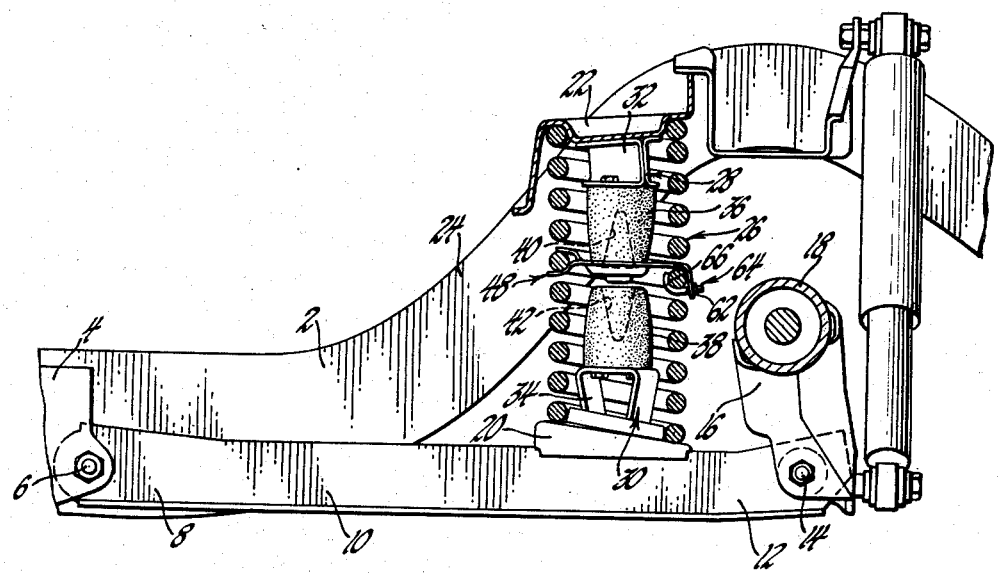
FIG. 1 is a side elevational view partly in section of a portion of a vehicle rear wheel suspension illustrating the form and arrangement of the invention.
Figures 2, 3:
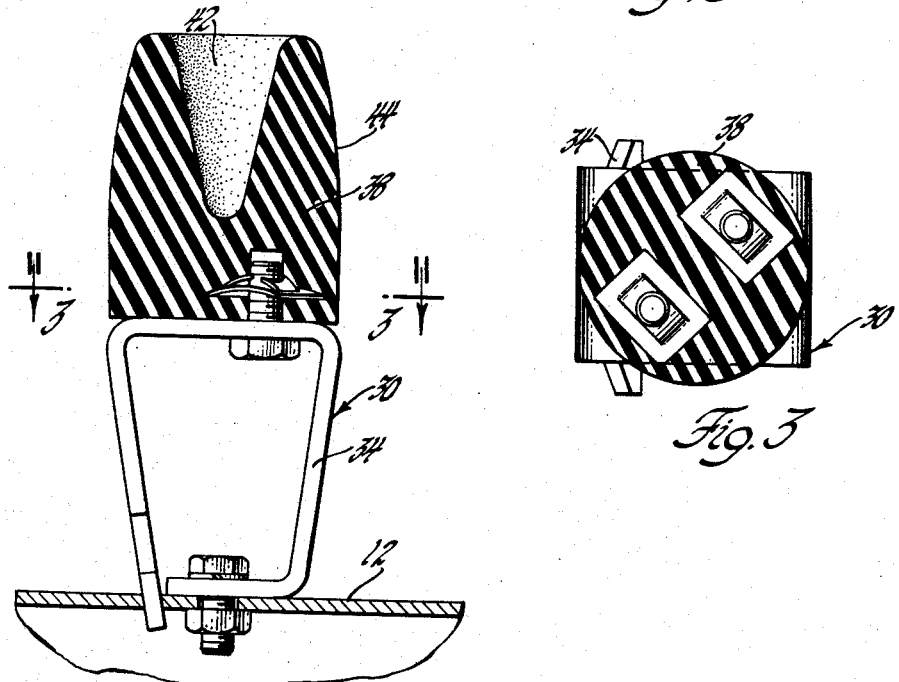
FIG. 2 is an enlarged sectional elevational view of the lower bump stop assembly shown in FIG. 1.
FIG. 3 is a view looking in the direction of arrows 3—3 of FIG. 2.

Referring now to the drawings and particularly FIG. 1, the reference numeral 2 designates generally a longitudinal frame side rail having a bracket 4 to which is pivotally attached at 6 the forward end 8 of a longitudinally trailing control arm 10. The rearward end 12 of arm 10 in turn is pivotally attached at 14 to a depending bracket 16 secured to rear axle housing 18.

Intermediate its ends, arm 10 is formed with a lower spring seat 20 which is located generally vertically below an upper spring seat 22 secured to the kick-up portion 24 of frame side rail 2. Disposed in compression between seats 20 and 22 is a conventional helical spring 26.

In accordance with the general features of the invention, a pair of bump stop assemblies 28 and 30 are disposed interiorly of the space bounded by helical spring 26 and are connected respectively to seats 20 and 22 by brackets 32 and 34. Each bump stop assembly 28 and 30 includes an elastic rubber-like element 36 and 38 of identical configuration which are arranged in vertically opposed relation and normally separated from each other by a predetermined distance which assures absence of abutting engagement under normal axle deflection at normal vehicle load.

In accordance with one feature of the invention, rubber-like elements 36 and 38 are formed with conical depressions 40 and 42 which extend in a direction of deflection of helical spring 26. The outer cylindrical surfaces 44 and 46 of elastic members 36 and 38 in turn are gradually tapered in the direction of their free ends so that the rubber mass, in cross section, is progressively thicker toward the apex of the conical depression 40 or 42. In operation, the progressively increasing thickness of the rubber mass results in gradual increase in elastic resistance as elastic elements 36 and 38 are progressively deflected by increased vehicle load, with the result that the additional spring rate produced by the bump stop merges gradually with the rate of the helical spring and thereafter builds up rapidly to assist the latter in supporting excessive load.

According to another feature of the invention, the smoothness and efficiency of the overload sustaining capability of the invention is further enhanced by interposition of a horizontally disposed circular striker plate 48 on spring 26 between the opposed free ends of elastic elements 36 and 38. As seen best in FIG. 1, striker plate 48 is located vertically on coil spring 26 between upper elastic element 36 and lower elastic element 38 in a position such that under normal vehicle load, the spacing between the plate and upper elastic element 36 is substantially less than the spacing between the striker plate and lower elastic element 38. Therefore, in operation, upon initial compression deflection of coil spring 26, sequential engagement of plate 48 by elements 36 and 38 occurs with the result that the gradual merging of primary spring rate and auxiliary spring rate is further improved.

According to another feature of the invention, striker plate 48 is formed in such a way as to permit expeditious vertical adjustment thereof along helical spring 26 so that precise initial installation and subsequent service adjustment may be easily accomplished. As seen best in FIG. 6, striker plate 48 is a generally circular sheet metal element having an intersupported arcuate flange portion 50 which is raised from the central circular bump stop engaging portion 52 and inclined in side elevation relative thereto so that the latter is maintained in a substantially horizontal position in situ regardless of the angular adjustment relative to spring 26 required to obtain the desired differential spacing between the portion 52 and the respective elastic elements 36 and 38. Circumferentially adjacent the terminal extremity 54 of flange 50, plate 48 is formed with a downwardly offset radially extending tang 56 which engages the side of the spring coil opposite that engaged by flange 50. Diametrically opposite tang 56, plate 48 is formed with a downwardly extending tab 58 having an aperture 60 formed therein which is adapted to receive the threaded end 62 of clamp bolt 64 (FIG. 1). Clamp bolt 64 is formed with a C-shaped inner end 66 which embraces the spring coil adjacent tab 58 and serves to lock the plate 48 against angular movement relative to helical spring 26 after the desired vertical adjustment of the plate has been achieved.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. Motor vehicle suspension comprising, a helical spring disposed in compression between an upper and a lower spring seat, a depending elastic bumper attached to said upper spring seat, an upwardly extending elastic bumper attached to said lower spring seat, and a striker plate adapted to be contacted by said bumpers, said striker plate being fixedly attached to said helical spring between the free ends of said bumpers and normally spaced nearer the depending elastic bumper whereby said striker plate is sequentially engaged by said bumpers.

2. The structure set forth in claim 1 wherein said striker plate is formed with a horizontal central portion and a spring engaging flange portion disposed at an angle to said horizontal portion corresponding to the helix angle of said spring.

3. The structure set forth in claim 1 wherein said striker plate includes spring attachment means permitting rotary adjustment thereof relative to said helical spring so as to initially establish said unequal vertical spacing relative to said bumpers.

References Cited in the file of this patent
UNITED STATES PATENTS

| | | |
|---|---|---|
| 214,329 | Vose | Apr. 15, 1879 |
| 2,096,115 | Leighton | Oct. 19, 1937 |
| 2,160,541 | Dubonnet | May 30, 1939 |
| 2,578,137 | Janeway | Dec. 11, 1951 |